US010181871B2

(12) United States Patent
Chen et al.

(10) Patent No.: US 10,181,871 B2
(45) Date of Patent: Jan. 15, 2019

(54) INTERACTIVE COMMUNICATION SYSTEM AND METHOD THEREFOR

(71) Applicant: Chiun Mai Communication Systems, Inc., New Taipei (TW)

(72) Inventors: Yi-Cheng Chen, New Taipei (TW); Hsiu-Min Cheng, New Taipei (TW); Chien-Yu Lin, New Taipei (TW); Yi-Mo Chang, New Taipei (TW); Sheng-Chien Huang, New Taipei (TW); Jyu-Han Song, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 0 days.

(21) Appl. No.: 15/011,643

(22) Filed: Jan. 31, 2016

(65) Prior Publication Data

US 2016/0241989 A1 Aug. 18, 2016

Related U.S. Application Data

(60) Provisional application No. 62/115,162, filed on Feb. 12, 2015.

(51) Int. Cl.
| | |
|---|---|
| *H04B 1/00* | (2006.01) |
| *H04B 1/3827* | (2015.01) |
| *H04W 4/04* | (2009.01) |
| *H04W 4/80* | (2018.01) |

(52) U.S. Cl.
CPC ............ *H04B 1/385* (2013.01); *H04W 4/04* (2013.01); *H04W 4/80* (2018.02)

(58) Field of Classification Search
CPC .................................................... H04W 4/008
USPC .................... 455/41.1, 41.2, 41.3
See application file for complete search history.

(56) References Cited

U.S. PATENT DOCUMENTS

| | | | |
|---|---|---|---|
| 2013/0003630 A1 | 1/2013 | Xhafa et al. | |
| 2013/0217332 A1* | 8/2013 | Altman | H04H 60/90 455/41.2 |
| 2014/0094123 A1* | 4/2014 | Polo | H04W 52/0216 455/41.2 |
| 2014/0185553 A1* | 7/2014 | Suzuki | H04L 1/1858 370/329 |
| 2014/0249891 A1 | 9/2014 | Olguin et al. | |
| 2015/0072618 A1* | 3/2015 | Granbery | H04W 4/008 455/41.2 |

(Continued)

FOREIGN PATENT DOCUMENTS

| | | |
|---|---|---|
| CN | 103888548 A | 6/2014 |
| CN | 204142952 U | 2/2015 |

*Primary Examiner* — Wen W Huang
(74) *Attorney, Agent, or Firm* — ScienBiziP, P.C.

(57) ABSTRACT

In an interactive communication system, one or more stations enter a scan mode to receive ID codes transmitted by wearable devices and transmit the ID codes to a server. The server receives the ID codes and transmits a command to one of the wearable devices via at least one of the stations. The one of the wearable devices receives the command via the at least one of the stations and transmits a feedback, in response to the command, to the server. The stations can detect signal strengths of the wearable devices. The server can determine a location of each of the wearable devices according to the ID codes and the signal strengths detected by the stations.

15 Claims, 6 Drawing Sheets

(56) References Cited

U.S. PATENT DOCUMENTS

| | | | |
|---|---|---|---|
| 2015/0262117 A1* | 9/2015 | Li ........................ | G06Q 10/087 235/385 |
| 2015/0281875 A1* | 10/2015 | Shin ..................... | H04W 4/008 455/41.2 |
| 2015/0296020 A1* | 10/2015 | Granqvist ............... | H04L 67/16 455/41.2 |
| 2015/0334511 A1* | 11/2015 | Rivera .................... | G06F 21/44 455/41.2 |
| 2016/0080891 A1* | 3/2016 | Basalamah ........... | H04W 4/008 455/41.2 |

\* cited by examiner

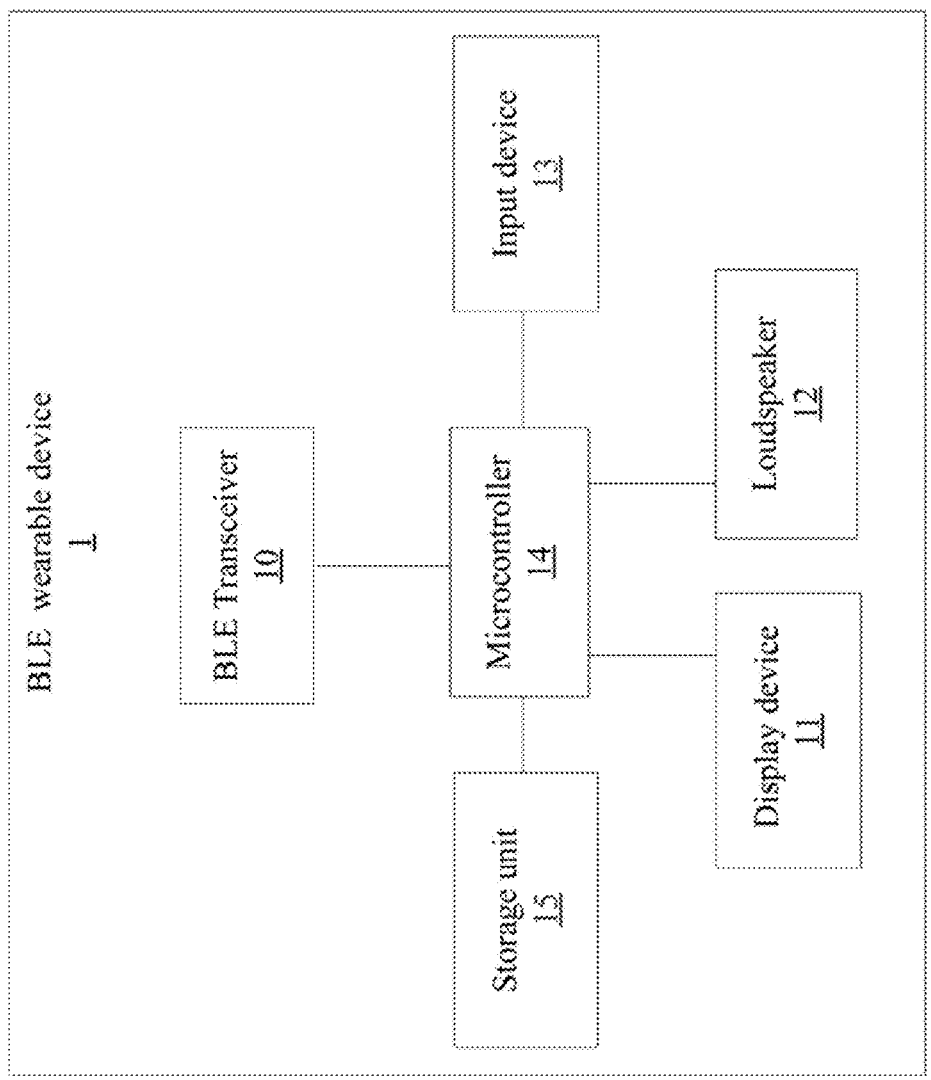

INTERACTIVE COMMUNICATION SYSTEM AND METHOD THEREFOR

CROSS-REFERENCE TO RELATED APPLICATIONS

This application is a non-provisional application of U.S. provisional application Ser. No. 62/115,162, filed Feb. 12, 2015.

FIELD

The subject matter herein generally relates to a communication system. More particularly, the present application relates to an interactive communication system and method therefor.

BACKGROUND

Handheld communication devices, such as mobile phones, tablet PCs etc., have high cost and high power consumption. Thus, the handheld communication devices need to be charged regularly, if not, they cannot be used continuously for a long time. In addition, for information security in particular circumstances or situations, it is difficult to control personal handheld communication devices. Someone may steal confidential information using the communication function or the camera function of the handheld communication devices. Thus, damage or loss may occur because the confidential information is leaked.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

FIG. 6 is block diagram of hardware architecture of a BLE wearable device of one embodiment of the present application.

DETAILED DESCRIPTION

Figure 1:
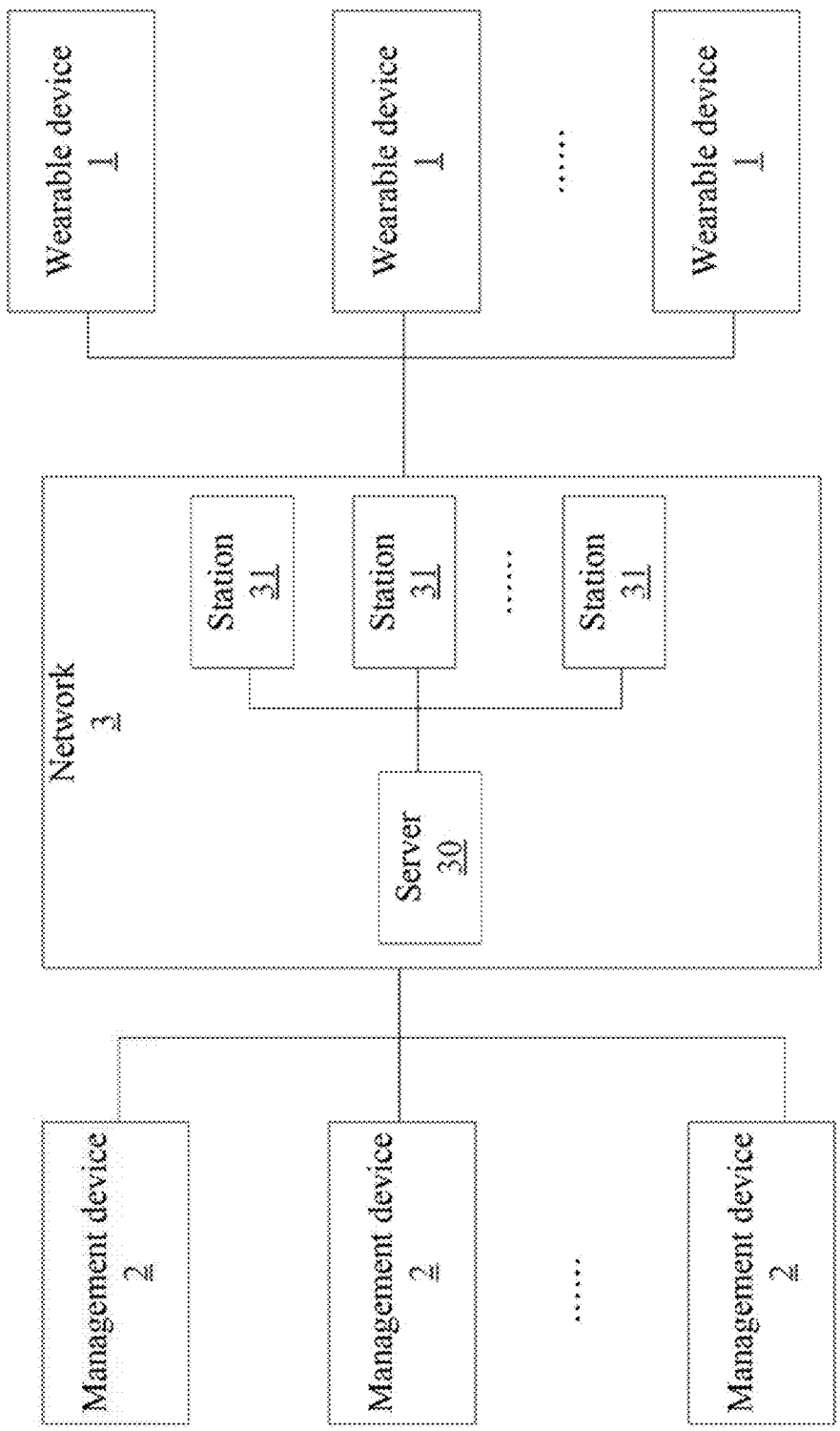
FIG. 1 is a system architecture of one embodiment of the present application.

It will be appreciated that for simplicity and clarity of illustration, where appropriate, reference numerals have been repeated among the different figures to indicate corresponding or analogous elements. In addition, numerous specific details are given in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

FIG. 1 is system architecture of one embodiment of the present application. The system architecture includes a plurality of wearable devices 1, a plurality of management devices 2, and a network 3 (such as, an Ethernet). In one embodiment, the system architecture can be implemented inside a building, e.g. a shopping mall, a factory, a hospital, a hotel, a restaurant, a airport or the like. The network 3 includes at least one server 30 and a plurality of stations 31. Each of the stations 31 connects to the server 30. The plurality of stations 31 are located in different selected regions (Region 1, Region 2, . . . Region N), for serving the wearable devices 1 in different regions.

In one embodiment, the plurality of stations 31 can be BLUETOOTH stations or access points. The plurality of wearable devices 1 can be BLUETOOTH Low Energy (BLE) wearable devices. In this embodiment, the plurality of stations 31 and the wearable devices 1 can be wirelessly connected via BLUETOOTH protocol. In another embodiment, the plurality of stations 31 and the wearable devices 1 can be wirelessly connected via other short distance wireless communication protocol, such as WIFI and ZIGBEE. Each of the BLE wearable devices 1 can include a BLE transceiver and can be a wrist strap, a necklace, glasses, a helmet, a wristband, a glove, an arm band, a leg band, or any other object which can be worn by a user. The server 30 transmits information to the BLE wearable devices 1 via the plurality of stations 31 located in different selected regions, so that the information can be known by users of the BLE wearable devices 1. The BLE transceiver in the BLE wearable devices 1 transmits information, e.g. ID code, to the stations 31 via at least one data channel and at least one advertising channel (not shown). In addition, the stations 31 can transmit information to the BLE wearable devices 1. Each of the BLE wearable devices 1 can further include a display device and/or a loudspeaker to display and/or play the information received by the BLE wearable device 1. In the embodiment, the management devices 2 can be any electronic devices which can communicate with the server 30. Each of the management devices 2 can be, but is not limited to, a wearable device, a handheld device, a personal computer, or a robot. The management devices 2 can communicate with the network 3, transmit information or data to the BLE wearable devices 1 via the stations 31 of the network 3 and receive information or data from the BLE wearable devices 1 via the stations 31 of the network 3. In another embodiment, the stations 31 can be handheld electronic devices which have BLUETOOTH communication modules, such as smart phones or tablet PCs.

Figure 2:
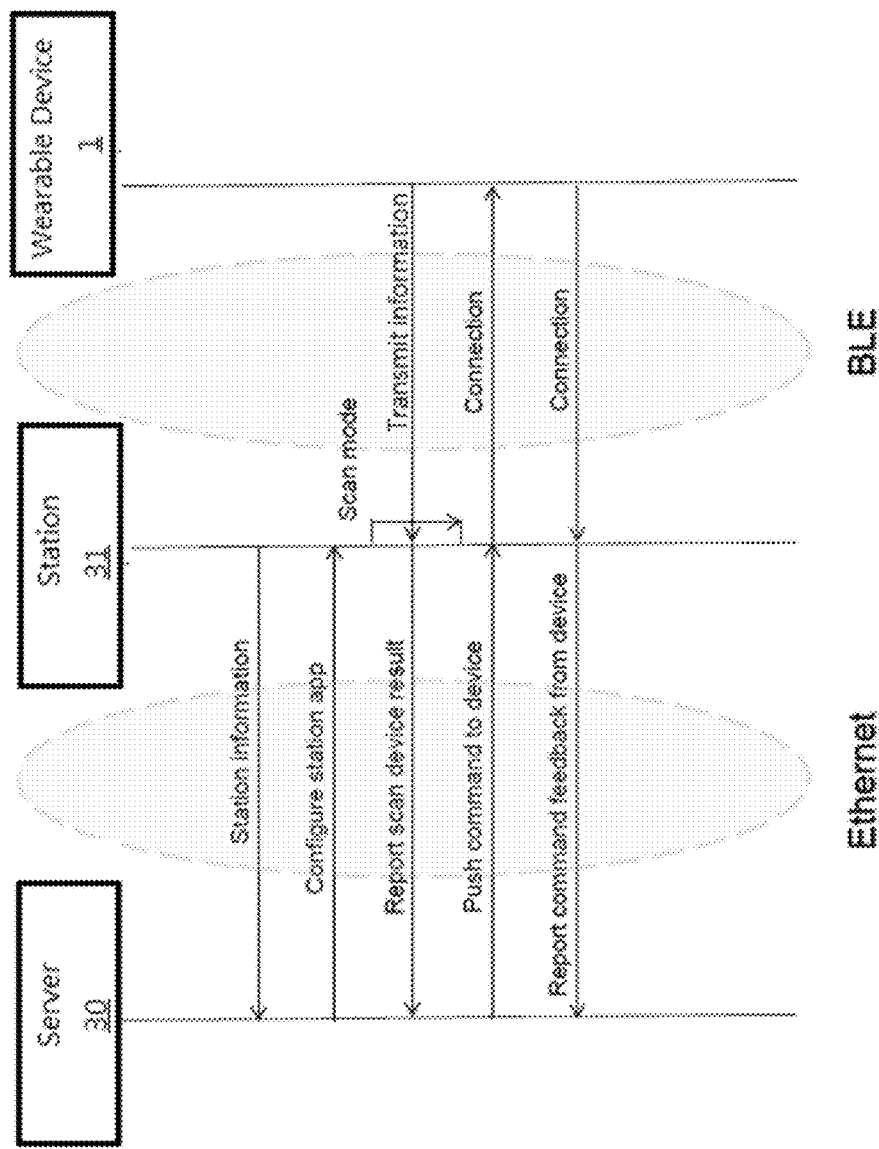
FIG. 2 is a diagram of a communication protocol of a first embodiment of the present application.
Figure 4:
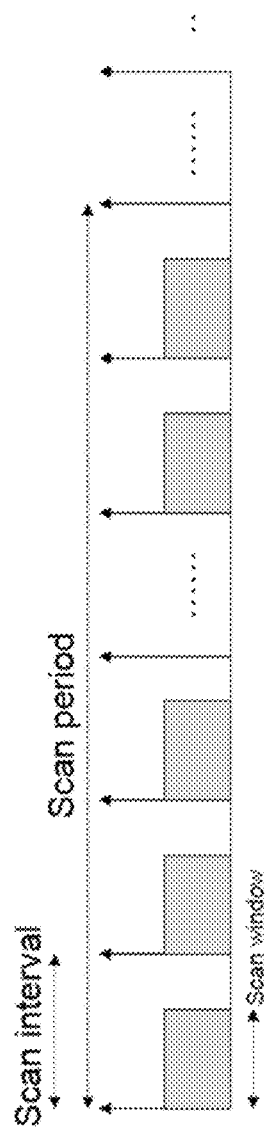
FIG. 4 is a diagram of a time sequence of scanning BLUETOOTH Low Energy (BLE) wearable devices of a station of one embodiment of the present application.

FIG. 2 is a diagram of a communication protocol of a first embodiment of the present application. FIG. 2 illustrates an interactive communication method implemented by the system architecture shown in FIG. 1. Firstly, the stations 31 transmit station information to the server 30. After receiving the station information, the server 30 configures station application, i.e., sets application configuration of the stations 31, to perform initialization settings. Then, the stations 31 enter a scan mode periodically, as shown in FIG. 4, to scan (namely receive) information which is transmitted by the BLE wearable devices 1 via advertising channels. When a BLE wearable device 1 enters a service region covered by one of the stations 31, the BLE wearable device 1 can transmit information itself, such as an ID code of the BLE wearable device 1, to the station 31 which is in the scan mode. In this embodiment, each BLE wearable device 1 has a unique ID code so that the stations 31 and the server 30 can identify different BLE wearable devices 1 with different ID codes of the BLE wearable devices 1. In one embodiment, the information transmitted by the BLE wearable device 1 may include power information including, but not limited to, remaining power (e.g. 20%) of a battery installed inside the BLE wearable device 1 (not shown) or whether any power failure has occurred in the battery. Afterward, based on the scanned BLE wearable devices 1 and the information received from the scanned BLE wearable devices 1, the station 31 reports, i.e. transmits, a scan device result including the received information, (e.g., the ID code or power information) to the server 30. When the server 30 receives the scan device result, the server 30 may display the received information or perform a task according to the received information.

In one embodiment, the station 31 can detect signal strength of the BLE wearable device 1 and report the signal strength to the server 30. The server 30 can determine a location of each of the BLE wearable devices 1 according to the ID codes and the signal strengths received from different stations. For example, when a BLE wearable device 1 enters service regions covered by a station A and a station B, both the station A and the station B can receive an ID code of the BLE wearable device 1. When a distance between the BLE wearable device 1 and the station A (the first distance) is short, and a distance between the BLE wearable device 1 and the station B (the second distance) is long, then the signal strength of the BLE wearable device detected by the station A is strong, and the signal strength of the BLE wearable device detected by the station B is weak. Accordingly, the server 30 can determine the BLE wearable device 1 is nearest to the station A according to the signal strengths. Then, the server 30 can record location information of each of the BLE wearable devices 1 according to the ID codes and the signal strengths obtained from the stations 31, establish connections with the BLE wearable devices 1 via corresponding stations 31 according to the location information, and push, i.e. transmit, different commands (or information) to different BLE wearable devices 1. When receiving the command or information, the BLE wearable device 1 can report, i.e. transmit, a command feedback, in response to the command, to the server 30 via the corresponding station 31, to acknowledge that the command or information was received.

Figure 3:
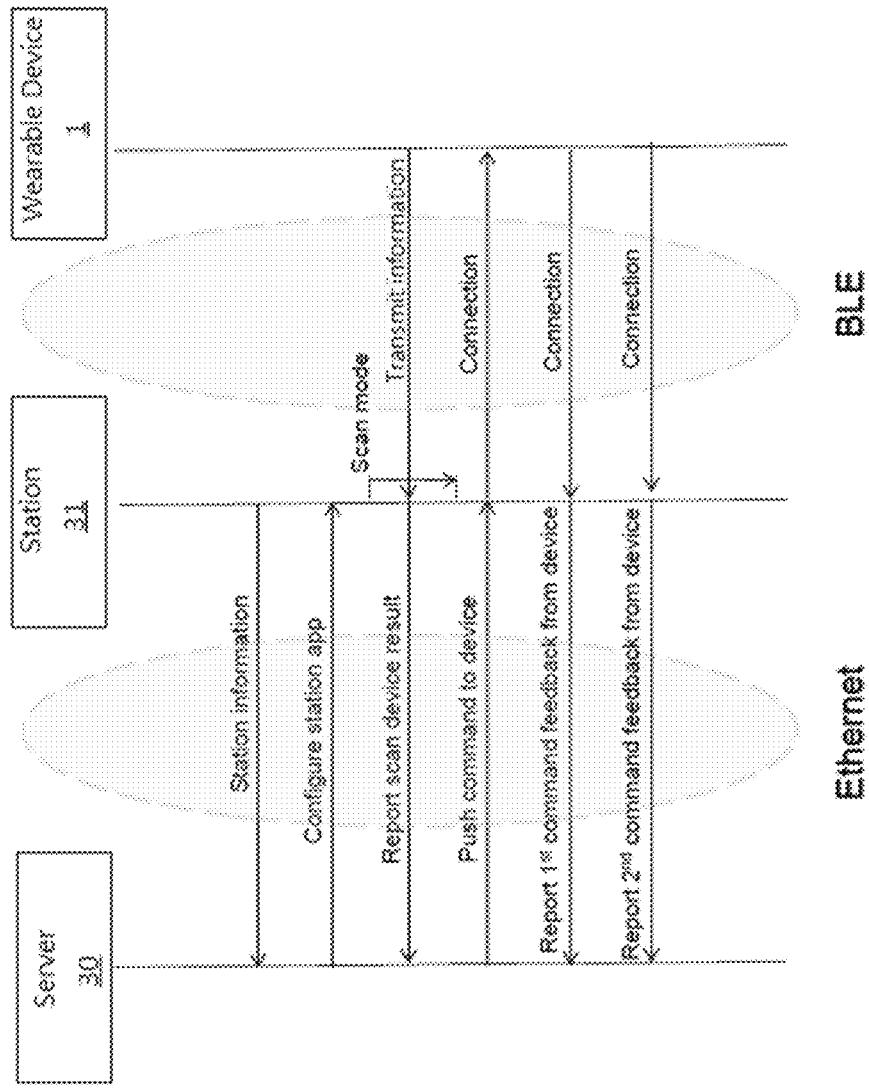
FIG. 3 is a diagram of a communication protocol of a second embodiment of the present application.

In another embodiment, a command pushed by the server 30 can further include feedback times to inform a BLE wearable device 1 of a number of command feedbacks the BLE wearable device need to report to the server 30, in response to the command. As shown in FIG. 3, the feedback times included in a command pushed by the server 30 indicate that the BLE wearable device 1 needs to report command feedback to the server 30 twice. When the BLE wearable device 1 receives the command, the BLE wearable device 1 needs to establish connections with the server 30 two times, which are used to report two command feedbacks with different information to the server 30. For example, the first command feedback indicates that the BLE wearable device 1 has received the command, and the second command feedback indicates that a user of the BLE wearable device 1 has complete work or task defined in the command. In the embodiment, the feedback times can be represented by bit/bits. For example, one bit can be used to represent one time (0) or two times (1), two bits can be used to represent one time (00), two times (01), three times (10), and four times (11), and so on.

In the embodiment, the management device 2 includes at least one display device, which is used to display location information of the BLE wearable devices 1 recorded by the server 30, and display information according to the feedback received from the BLE wearable devices 1. The management device 2 further includes an inputting device, which is used to receive information or command (namely the information or command pushed by the server mentioned above) inputted by a system manager. The management device 2 can transmit the inputted information or command to the server 30, and the server 30 and the stations 31 can further transmit the inputted information or command to all of or some specified BLE wearable devices 1.

FIG. 4 is a diagram of a time sequence of scanning BLE wearable devices 1 by a station 31 of one embodiment of the present application. Referring now to FIG. 3 and FIG. 4, when entering into a scan mode, a station 31 can periodically scan (namely receive) information transmitted by the BLE wearable device 1 via advertising channels in a scan period. The scan period includes several scan intervals. Each of the scan intervals includes a scan window. The scan window is used to actually scan (namely receive) the information transmitted by the BLE wearable devices 1 via advertising channels.

Figure 5:
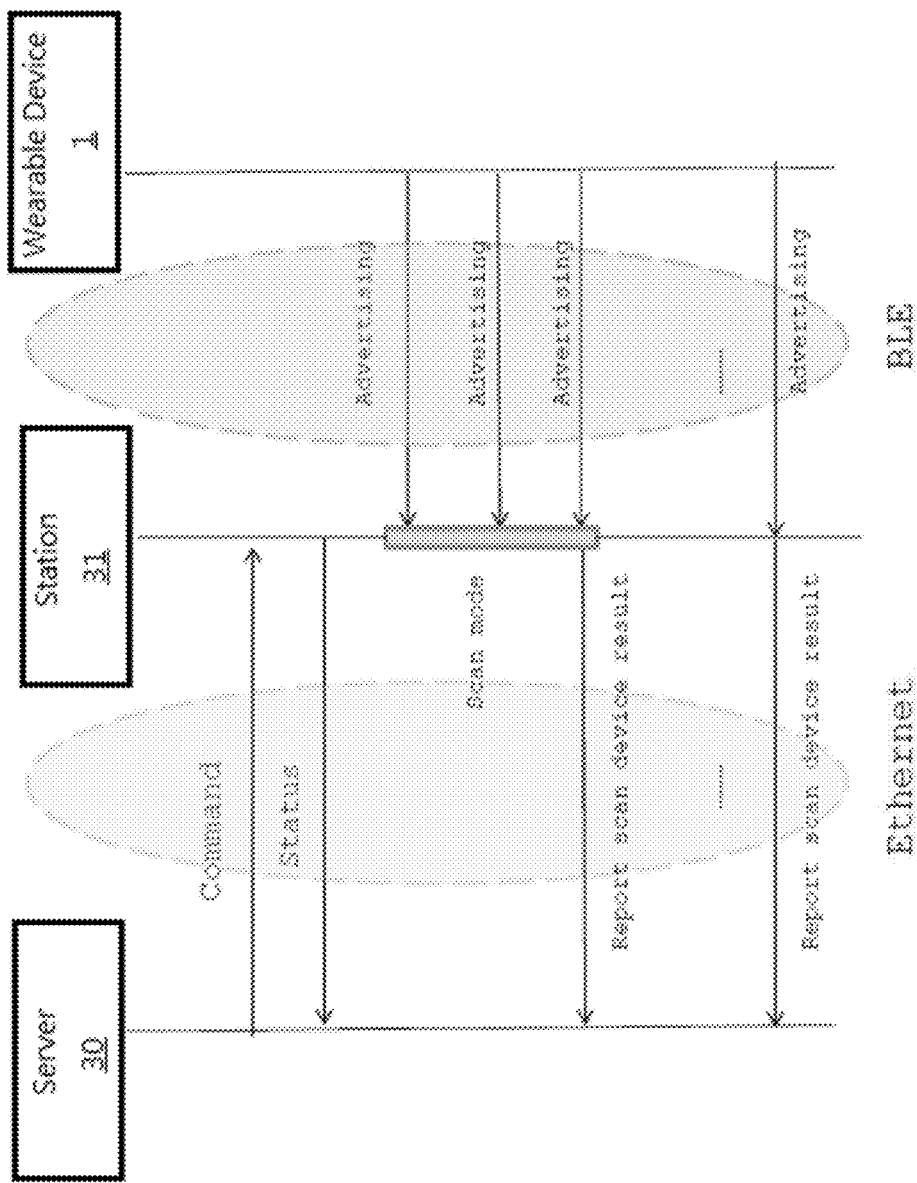
FIG. 5 is a diagram of a communication protocol of a third embodiment of the present application.

FIG. 5 is a diagram of a communication protocol of a third embodiment of the present application. FIG. 5 illustrates another interactive communication method implemented by the system architecture shown in FIG. 1. Referring now to FIG. 5, in the embodiment, the server 30 can transmit a setting command to the stations 31 for setting time parameters of a scan mode to stations 31, so that each of the stations 31 can scan BLE wearable devices 1 located around itself according to the time parameters in the scan mode. The time parameters include a scan period, a scan interval, a scan window, and so on. When receiving the command, the station 31 can transmit a status signal to the server 30, to inform the server 30 of whether the time parameters have been set successfully at the station 31. When the stations 31 enter into the scan mode, each of the stations 31 can scan a plurality of BLE wearable devices 1, and receive information (e.g., an ID code of the BLE wearable device) from each of the plurality of BLE wearable devices 1 via advertising channels. When the scan mode ends, each of the stations 31 reports a scan device result including the received information to the server 30. In another embodiment, the scan window can be set to 5 ms, the scan interval can be set to 10 ms, the scan period can be set to 60 s, and a predetermined number (100, for example) of the BLE wearable devices can be set into the server 30 via the management device 2. Thus, each of the stations 31 can scan BLE wearable devices 1 during the scan mode according to the set time parameters (for example, 5 ms of the scan window, 10 ms of the scan interval, and 60 s of the scan period) and receive information (for example, ID codes) from a plurality of BLE wearable devices 1. When the scan mode ends, each of the stations 31 transmits a scan device result including the received information to the server 30. Then, the server 30 can calculate, based on the scan device results, an actual number (85, for example) of the BLE wearable devices 1 scanned by each of the stations 31, and then compares the predetermined number (100, for example) and the actual number (85, for example). When the predetermined number (100, for example) is greater than the actually number (85, for example), or a difference (15, for example) between the predetermined number (100, for example) and the actual number (85, for example) is greater than a threshold (10, for example), which may mean that there is not enough time to scan all the BLE wearable devices 1, the server 30 can transmit another command to adjust the time parameters of the scan mode. In one embodiment, the server 30 can transmit another command to a station 31 to increase the scan period from 60 s to 120 s. Afterward, the server 30 may calculate again an actual number (89, for example) of the BLE wearable devices 1 scanned by each of the stations 31, and compare the predetermined number and the actual number. When the predetermined number (100, for example) is still greater than the actually number (89, for example), or a difference (11, for example) between the predetermined number (100, for example) and the actual number (89, for example) is still greater than the threshold (10, for example), the server 30 can transmit a further command to the station 31 to increase the scan interval or the scan window, for example, increasing the scan interval from 10 ms to 20 ms, and/or increasing the scan window from 5 ms to 10 ms. When the predetermined number (100, for example) is equal to an actual number (100, for example), or a difference (8, for example) between the predetermined number (100, for example) and the actual number (92, for example) is less than the threshold (10, for example), the server 30 stops adjusting the time parameters of the scan mode and/or transmits a command to adjust the time parameters of the scan mode to preset values.

FIG. 6 is hardware architecture of a BLE wearable device of one embodiment of the present application. In the embodiment, the BLE wearable device 1 can be a wrist strap and wearable on a wrist of a user. The BLE wearable device 1 includes a BLE transceiver 10, a display device 11 (such as an organic light-emitting diode (OLED) display device, or any other passive display device), an input device 13 (such as, an input key, or a proximity sensor), and a microcontroller 14. In another embodiment, the BLE wearable device 1 consists of a BLE transceiver 10, a display device 11 (such as an organic light-emitting diode (OLED) display device, or any other passive display device), and an input device 13 (such as, an input key, or a proximity sensor), and a microcontroller 14. The BLE wearable device 1 has characters of low power consumption, low delay, small packet, and so on. Compared with the handheld communication devices, such as mobile phones and tablet PCs, which have big screen and camera, the BLE wearable device is lighter and easier to be carried, its power can last longer, and its confidentiality for data can be ensured. Accordingly, the BLE wearable devices 1 are suitable for being used in circumstances or situations in which information security is highly requested. The BLE transceiver 10 is electrically connected to the microcontroller 14, and has an antenna (not shown) which is configured to receive commands (or information) from the stations 31, and to transmit the received command (or information) to the microcontroller 14. The microcontroller 14 is electrically connected to the display device 11 and the input device 13. When receiving the command (or information), the microcontroller 14 can control the display device 11 to display corresponding information to a user according to the command (or information). In another embodiment, the BLE wearable device 1 can also include a loudspeaker 12, which is configured to play a corresponding audio to the user according to the command (or information). In addition, the BLE wearable device 1 can also include a storage unit 15, which is configured to cache or store the command (or information) received from the stations 31. When the user sees the corresponding information showed on the display device 11 or hears the corresponding audio played by the loudspeaker 12, the user can input a first command feedback via the input device 13 (e.g. by pressing the input key or by touching/approaching the proximity sensor) to acknowledge that the command (or information) from the stations 31 have been received. When the command (or information) includes a feedback times and the feedback times is two (referring to FIG. 3), the user can further input a second command feedback via the input device 13 (e.g. pressing the input key or touching the proximity sensor) to acknowledge that a work or task defined in the command has been completed. The input 13 can transmit the first command feedback and/or the second command feedback to the microcontroller 14. Then, the microcontroller 14 can transmit the first command feedback and/or the second command feedback to the BLE transceiver 10, and thus, the first command feedback and/or the second command feedback can be transmitted to the station 31, in response to the command, via the BLE transceiver 10. Finally, the station 31 can report the first command feedback and/or the second command feedback to the server 30 as shown in FIG. 2 and FIG. 3.

Now referring to FIG. 5 and FIG. 6, in another embodiment, the BLE wearable device 1 can further include a timer (not shown) electrically to the microcontroller 14. The timer will be triggered to start counting for a period of time (e.g. 2 minutes) when the BLE wearable device 1 transmits information, including a connection request, to a station 31 via an advertising channel. In this embodiment, when the station 31 establishes a connection, in response to the connection request, with the BLE wearable device 1 within the period of time (e.g. 2 minutes), the timer can be reset. When there is no station 31 establishing a connection with the BLE wearable device 1, the timer will count over the period of time (e.g. 2 minutes) and the display device 11 of the BLE wearable device 1 can display a message or icon indicating the BLE wearable device 1 is not connected to any of the stations 31. In this embodiment, the BLE wearable device 1 will periodically (e.g. every 10 minutes) transmit the information, including a connection request, to a station 31 via the advertising channel.

In one embodiment, the BLE wearable device 1 can transmits information, including synchronization request, to a station 31 via an advertising channel. The station 31 receives the synchronization request and then transmits time information to the BLE wearable device 1 in response to the synchronization request so that the display device 11 of the BLE wearable device 1 can receive the time information and display time according to the time information.

The management, notification, and service system in the present application as described in the above embodiments can be applied to a plurality of different situations. One example is given below. For example, during a movie premiere, guests or staff are not permitted to carry a mobile phone with a camera function. Thus, a manager (namely sponsor) can use the management, notification, and service system in the present application to serve the guests and deal with occurring incidences. In the example, each of the staff wears a BLE wearable device (a wrist strap, for example). When an incident occurs, the manager can acquire a list of the BLE wearable devices near a location of the event via a management device from the server, and input a solution for the incident (a command or information, for example) via the management device. Afterward, the management device can transmit the solution to the server, and then, the solution can be transmitted to the BLE wearable devices near the location of the incident via a corresponding station. When staff of the BLE wearable devices receive the solution (the command or information, for example), a first command feedback can be inputted by the staff and transmitted to the corresponding station, and then further transmitted to the management device via the corresponding station and the server. After dealing with the incident, the staff can input a second command feedback to the BLE wearable devices and to be transmitted to the corresponding station, to inform the manager that the incident has been solved. Thus, in the embodiment, the manager of the movie premiere can know a location of the staff according to the information transmitted from the server, and provide commands or information to the staff, to ensure the event can proceed smoothly.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An interactive communication system comprising:
   a plurality of wearable devices; and
   a network comprising at least one server and a plurality of stations for serving the wearable devices,
   wherein at least one of the stations is configured to receive an ID code from one of the wearable devices and to transmit the ID code to the server, and the server is configured to receive the ID code and transmit a command to the one of the wearable devices via the at least one of the stations; and
   wherein the one of the wearable devices is configured to receive the command via the at least one of the stations and transmit two feedbacks, in response to the command, to the server via the at least one of the stations, wherein the two feedbacks comprise a first feedback indicating that the one of the wearable devices has received the command, and a second feedback indicating that a user of the one of the wearable devices has completed work or a task defined in the command;
   wherein the one of the wearable devices generates the two feedbacks in response to user input, the user input being input by approaching a proximity sensor of the one of the wearable devices;
   wherein the at least one of the stations is further configured to enter a scan mode to receive the ID code from the one of the wearable devices, and the server is further configured to transmit a setting command to the at least one of the stations for setting time parameters of the scan mode;
   wherein the time parameters comprise a scan period of the scan mode;
   wherein when a difference between a predetermined number of the plurality of wearable devices and an actual number of the wearable devices scanned by the at least one of the stations is greater than a threshold quantity, the server determines that there is not enough time for the at least one of the stations to scan all the plurality of wearable devices, and the server is further configured to transmit the setting command to increase the scan period.

2. The interactive communication system according to claim 1, wherein the plurality of stations are BLUETOOTH stations or BLUETOOTH access points, the wearable devices are BLE wearable devices, and the ID code is transmitted via an advertising channel from the one of the wearable devices.

3. The interactive communication system according to claim 1, wherein the interactive communication system is implemented inside a building.

4. The interactive communication system according to claim 3, wherein the one of the wearable devices is a wrist strap, a necklace, glasses, a helmet, a wristband, a glove, an arm band, or a leg band.

5. The interactive communication system according to claim 4, wherein the one of the wearable devices has a display device to display information.

6. The interactive communication system according to claim 1, further comprising at least one management device, wherein the management device includes an inputting device configured to input the command and is configured to transmit the command to the server.

7. The interactive communication system according to claim 6, wherein the management device includes a display device configured to display information according to the feedback.

8. The interactive communication system according to claim 1, wherein the at least one of stations is further configured to detect signal strength of the one of the wearable devices, and the server is further configured to determine a location of the one of the wearable devices according to the ID code and the signal strength;
   wherein a distance between the one of the wearable devices and the at least one of stations is less than a distance between the one of the wearable devices and other stations.

9. The interactive communication system according to claim 8, further comprising at least one management device including a display device configured to display the location of the one of the wearable devices.

10. The interactive communication system according to claim 1, wherein the command comprises feedback times for informing the one of the wearable devices of a number of feedbacks needed to be transmitted to the server in response to the command; wherein the one of the wearable devices establishes connections with the server two times, which are used to report the two feedbacks to the server respectively.

11. An interactive communication method for an interactive communication system, which includes a plurality of wearable devices and a network comprising at least one server and a plurality of stations, the method comprising:
   transmitting, by one of the wearable devices, an ID code to at least one of the stations; and
   receiving, by at least one of the stations, the ID code from the one of the wearable devices and transmitting, by the at least one of the stations, the ID code to the server;
   receiving, by the server, the ID code from the at least one of the stations and transmitting, by the server, a command to the one of the wearable devices via the at least one of the stations; and
   receiving, by the one of the wearable devices, the command and transmitting, two feedbacks, in response to the command, to the server via the at least one of the stations, wherein the two feedbacks comprise a first feedback indicating that the one of the wearable devices has received the command, and a second feedback indicating that a user of the one of the wearable devices has completed work or a task defined in the command;

wherein the one of the wearable devices generates the two feedbacks in response to user input, the user input being input by approaching a proximity sensor of the one of the wearable devices;

wherein the method further comprises:

entering, by the at least one of the stations, a scan mode to receive the ID code from the one of the wearable devices; and transmitting, by the server, a setting command to the at least one of the stations for setting time parameters of the scan mode;

wherein the time parameters comprise a scan period of the scan mode;

wherein when a difference between a predetermined number of the plurality of wearable devices and an actual number of the wearable devices scanned by the at least one of the stations is greater than a threshold quantity, the server determines that there is not enough time for the at least one of the stations to scan all the plurality of wearable devices, and the server is configured to transmit the setting command to increase the scan period.

12. The interactive communication method according to claim 11, further comprising:
displaying, by a display device of the one of the wearable devices, information received from the at least one of the stations.

13. The interactive communication method according to claim 11, wherein the interactive communication system further comprises a management device including an inputting device, and the method further comprises:
inputting, by the inputting device, the command and transmitting, by the inputting device, the command to the server.

14. The interactive communication method according to claim 13, further comprising:
detecting, by the at least one of stations, signal strength of the one of the wearable devices; and
determining, by the server, a location of the one of the wearable devices according to the ID code and the signal strength;
wherein a distance between the one of the wearable devices and the at least one of stations is less than a distance between the one of the wearable devices and other stations.

15. The interactive communication method according to claim 14, wherein the interactive communication system further comprises a management device including a display device, and the method further comprises:
displaying, by the display device, the location of the one of the wearable devices.

* * * * *